Jan. 9, 1923.

J. I. VAN ORDEN.
DETACHABLE GROUTER FOR WHEELS.
FILED AUG. 26, 1921.

1,441,645.

INVENTOR
James I. Van Orden
BY
Townsend & Decker
ATTORNEYS

Patented Jan. 9, 1923.

1,441,645

UNITED STATES PATENT OFFICE.

JAMES I. VAN ORDEN, OF HACKENSACK, NEW JERSEY.

DETACHABLE GROUTER FOR WHEELS.

Application filed August 26, 1921. Serial No. 495,495.

*To all whom it may concern:*

Be it known that I, JAMES I. VAN ORDEN, a citizen of the United States, and a resident of Hackensack, in the county of Bergen and State of New Jersey, have invented certain new and useful Improvements in Detachable Grouters for Wheels, of which the following is a specification.

My invention relates to wheels for vehicles or tractors and more particularly to grouter attachments which may be detachably secured to said wheels whereby they will be enabled to effectively travel in marshy or insecure ground without slipping.

The principal object of the invention is the production of a grouter attachment for wheels which shall be strong and of simplicity of construction and which shall be capable of expeditious attachment to or detachment from the wheel.

Other and further objects and advantages of the invention will appear from the accompanying description, the invention consisting in the novel parts and combinations of parts hereinafter more particularly described and then specified in the claims.

In the accompanying drawing I have shown a practical embodiment of the invention as applied to a common type of wheel used on a motor truck, said wheel being supplied with a solid rubber tire engaging the felly with a removable rim for holding the tire in proper position. It will be understood, however, that the invention is not limited in its application to the specific type of wheel shown but that it may be used as effectively with other types without departing from the spirit of the invention.

Figure 1:
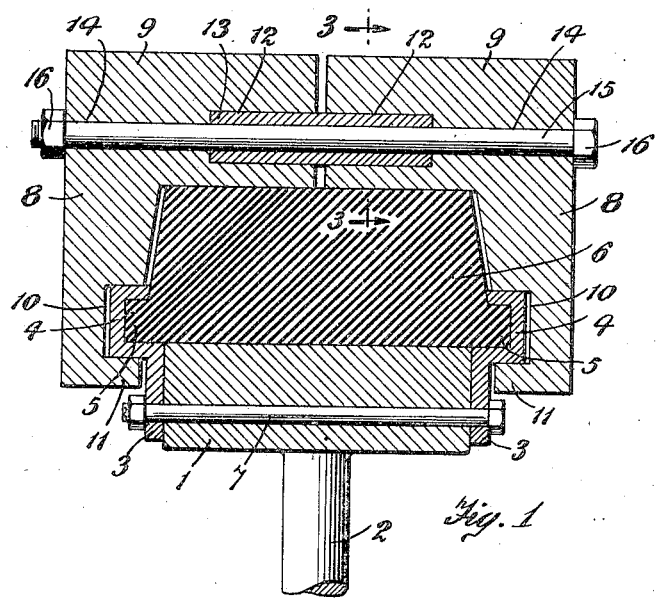
Fig. 1 is a horizontal section taken through a portion of a wheel showing my improved grouter attachment applied thereto.

Referring in detail to the several figures of the drawing:

1 indicates the felly of the wheel, 2 one of the spokes thereof, 3 the rims provided with channels 4 adapted to snugly receive the flanges 5 of a tire 6 whereby the tire is securely held to the rims. The said rims 3 may be held to the felly by suitable bolts 7 passing through the rims and felly and detachably held in position by nuts as illustrated. All of the parts just described form no part of my invention and are shown merely for the purpose of illustrating the manner in which my invention may be used.

Figure 2:
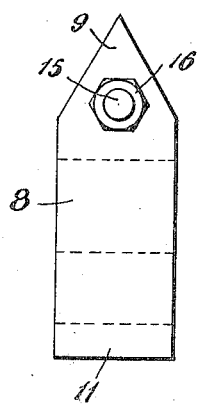
Fig. 2 is a side elevation of one member of the attachment.
Figure 3:
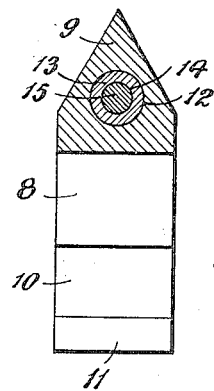
Fig. 3 is a vertical cross-section on the line 3—3 of Fig. 1.

My detachable grouter comprises essentially two side members adapted to be detachably secured together and to the wheel. The bodies of said side members are indicated at 8 and are provided with horizontal arms 9 extending inwardly and transversely across the wheel with their sides tapering upwardly to a point as clearly illustrated in Figs. 2 and 3. The said side members also extend downwardly vertically to form arms which are recessed as at 10 to receive the channels 4 of the rims 3, said recesses forming hooks 11 at the lower ends of said side members adapted to engage the lower walls of said channels 4.

12 indicates annular bores or openings with which each of the arms 9 of the side members is provided adjacent its inner end, said bores extending longitudinally through said arms for a certain distance as indicated in Fig. 1. 13 indicates a strengthening and supporting bar or rod of substantial strength and having an opening extending longitudinally therethrough which bar or rod snugly and slidably interfits with the bores 12. The arms 9 are also provided with relatively small annular openings 14 extending longitudinally therethrough and communicating with the bores 12.

To mount the grouter on the wheel the side members are placed thereon in the position shown in Fig. 1 with the ends of the horizontal arms 9 in juxtaposition, the lower sides of said arms preferably engaging the tire 6 and the recesses 10 receiving the channels 4 of the rims and the hooks 11 engaging the underside of the lower wall of said channels. The bar or rod 13 is also inserted within the bores 12 and the members are detachably clamped together and to the wheel by means of an elongated bolt 15 which extends through the annular openings 14 in the horizontal arms 9 as well as through the bar or rod 13 which effectively holds the parts together and permits them to be clamped tightly on the wheel by means of suitable nuts 16 screwed on the ends of said bolt and tightened against the outer ends of said side members.

The construction of the device described permits of its expeditious attachment to a wheel and the strengthening and supporting bar or rod 13 acts to reinforce the device at the place where the strains and stresses are greatest and prevents breakage of the bolt 15 in that the bolt is supported throughout its entire length. Thus a bolt of relatively small diameter may be used which is desirable as it makes for lightness of weight of the structure as a whole while at the same time retaining the required strength.

When an automobile or other vehicle is run into soft dirt or mud and the vehicle can not be released therefrom because of the "spinning" or slipping of the wheels the invention will be found useful as one or more of the grouters may be applied to one or more of the wheels of the vehicle so that when the wheels are rotated the pointed tops of the side members of the device will effectively dig into the earth and grip the same and prevent the wheels from slipping and thereby enable the vehicle to travel through the soft dirt or mud in an obvious manner.

When the device is to be applied to a vehicle wheel having pneumatic tires the hooks 11 will engage beneath the rims of the tires and the lower sides of the arms 9 will preferably rest on said tires. In the case of a tractor wheel, the hooks 11 will grip the underside of the felly of the wheel and the lower sides of the arms 9 will preferably engage the upper side of the felly. It will thus be seen that a slight modification in the proportion of the sizes of the various parts of the grouter may be easily made to suit varying conditions and still be within the invention and that the device may be applied to any type of wheel. It will accordingly be understood that in the appended claims when I refer to the hooks engaging the felly of the wheel, the term "felly" may be also construed to mean the wheel rim.

What I claim as my invention is:

1. In a grouter attachment for wheels, side members having horizontal arms extending transversely over the wheel, downwardly depending arms on said side members provided with hooks adapted to engage a part of said wheel and means extending longitudinally through said horizontal arms for detachably securing said side members together.

2. In a grouter attachment for wheels, side members extending over the wheel and provided with means adapted to engage a part of said wheel, said side members having openings therein, a strengthening bar extending within said openings and a bolt extending through said side members and said strengthening bar.

3. In a grouter attachment for wheels, side members having horizontal arms partially extending transversely over the wheel whereby their ends are in juxtaposition, downwardly depending arms on said side members provided with hooked ends adapted to engage a part of said wheel and detachable means for clamping said side members to said felly.

4. In a grouter attachment for wheels, side members having horizontal arms partially extending transversely across the wheel whereby their ends are in juxtaposition, downwardly depending arms on said side members provided with ends adapted to engage a part of said wheel and means extending through said horizontal arms for detachably fastening said side members in position.

5. In a grouter attachment for wheels, side members having horizontal arms extending transversely over the wheel and provided with openings therein, downwardly depending arms on said side members provided with hooks adapted to engage a portion of said wheel, a removable strengthening bar fitting within the openings in said horizontal arms and a removable bolt extending through said side members and said strengthening bar for clamping said side members in position.

6. In a grouter attachment for wheels, side members having horizontal arms extending transversely over the wheel whereby their ends will be brought into juxtaposition, said horizontal arms being provided with bores therein and with pointed upper sides, downwardly depending arms on said side members provided with hooked ends adapted to engage a part of said wheel, a removable strengthening rod fitting within said bores in said horizontal arms and a bolt extending through said horizontal arms and said rod for clamping said side members in position.

Signed at New York, in the county of New York and State of New York, this 25th day of August, A. D. 1921.

JAMES I. VAN ORDEN.

Witnesses:
F. B. TOWNSEND,
W. R. WOMER.